(12) United States Patent
Petelka

(10) Patent No.: US 10,549,794 B2
(45) Date of Patent: Feb. 4, 2020

(54) SLIDING TARPAULIN SYSTEM AND BOW LIFT ASSEMBLIES

(71) Applicant: Petelka Investments Inc., Puslinch (CA)

(72) Inventor: Brian W. Petelka, Puslinch (CA)

(73) Assignee: PETELKA INVESTMENTS INC. (CA)

( * ) Notice: Subject to any disclaimer, the term of this patent is extended or adjusted under 35 U.S.C. 154(b) by 78 days.

(21) Appl. No.: 15/983,994

(22) Filed: May 18, 2018

(65) Prior Publication Data

US 2018/0334200 A1 Nov. 22, 2018

Related U.S. Application Data

(60) Provisional application No. 62/508,480, filed on May 19, 2017.

(51) Int. Cl.
*B62D 33/04* (2006.01)
*B60J 7/06* (2006.01)

(52) U.S. Cl.
CPC .............. *B62D 33/04* (2013.01); *B60J 7/065* (2013.01)

(58) Field of Classification Search
CPC ................................ B62D 33/04; B60J 7/065
See application file for complete search history.

(56) References Cited

U.S. PATENT DOCUMENTS

| 2006/0273614 | A1* | 12/2006 | Tuerk | B60J 7/062 296/100.12 |
| 2007/0063530 | A1* | 3/2007 | Petelka | B60J 7/065 296/100.12 |
| 2007/0085369 | A1* | 4/2007 | Henning, Jr. | B60J 7/065 296/100.12 |
| 2009/0206629 | A1* | 8/2009 | Damsi | B60J 7/102 296/100.14 |

(Continued)

FOREIGN PATENT DOCUMENTS

| CA | 2839204 A1 * | 7/2014 | B60J 5/065 |
| CA | 2625980 C  * | 12/2014 | |

OTHER PUBLICATIONS

Why Quick-draw is still the best choice; http://www.quickdrawtarps.com/products-en.html; May 4, 2017, Quick Draw Tarpaulin Systems.

*Primary Examiner* — Lori L Lyjak
(74) *Attorney, Agent, or Firm* — Jonathan Kidney; Intelink Law Group PC

(57) ABSTRACT

An uplift bow assembly and a sliding tarpaulin system are described. The uplift bow assembly includes first and second car plates and a frame having a center portion. The frame includes first and second downwardly extending frame arms connected respectively to the first and second car plates. The assembly also includes a plurality of uplift bows, each having a center portion and first and second downwardly extending bow arm pivotably connected to the first and second car plates respectively. Each of the first and second car plates is configured to support the selective pivoted (Continued)

connection of at least five uplift bows. The sliding tarpaulin system includes first and second tracks and a plurality of uplift bow assemblies that extend laterally across the trailer. The first and second car plates slideably engage the respective first and second tracks.

12 Claims, 19 Drawing Sheets

(56) References Cited

U.S. PATENT DOCUMENTS

| | | | |
|---|---|---|---|
| 2010/0078136 A1* | 4/2010 | Beshiri | B60J 7/104 160/293.1 |
| 2014/0197659 A1* | 7/2014 | Petelka | B60J 7/065 296/100.15 |

* cited by examiner

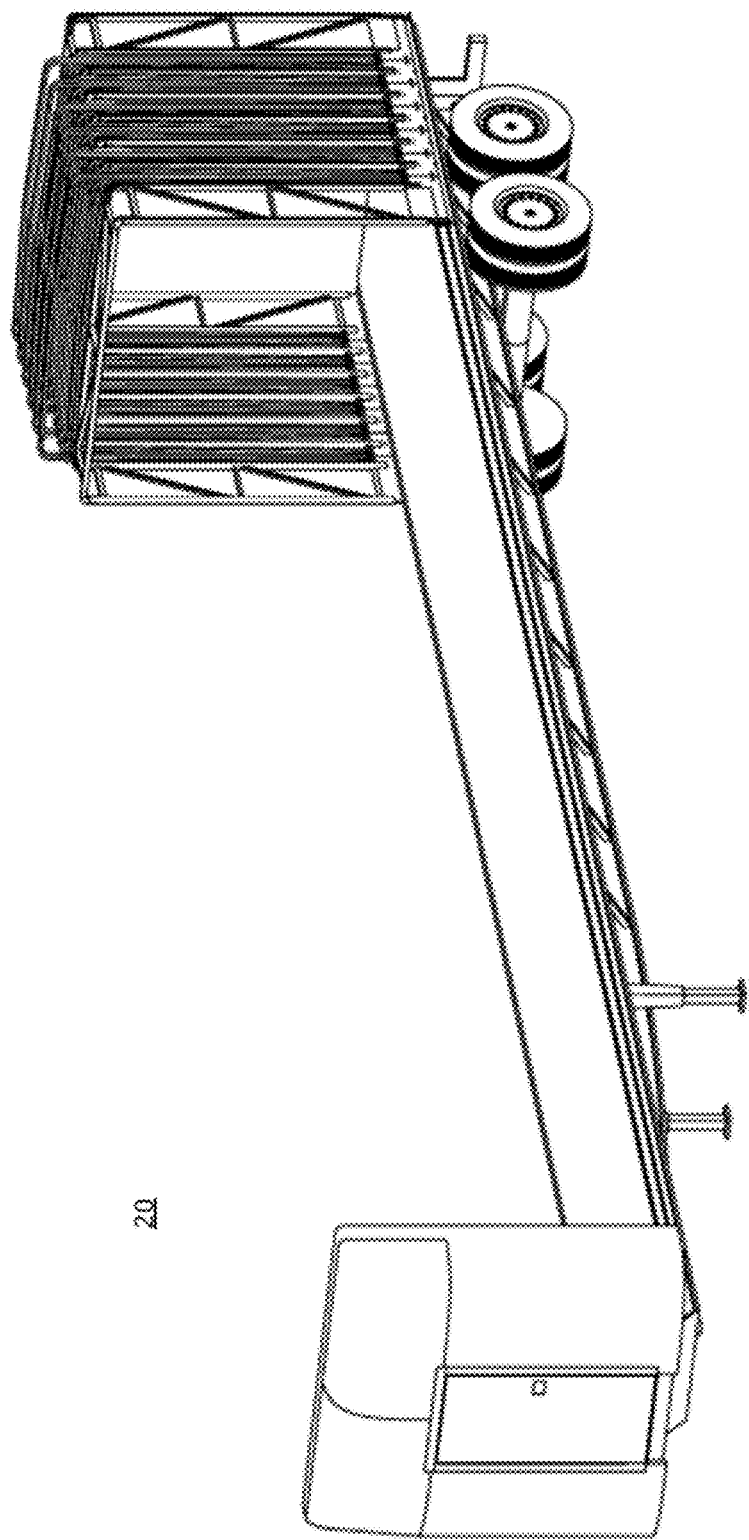

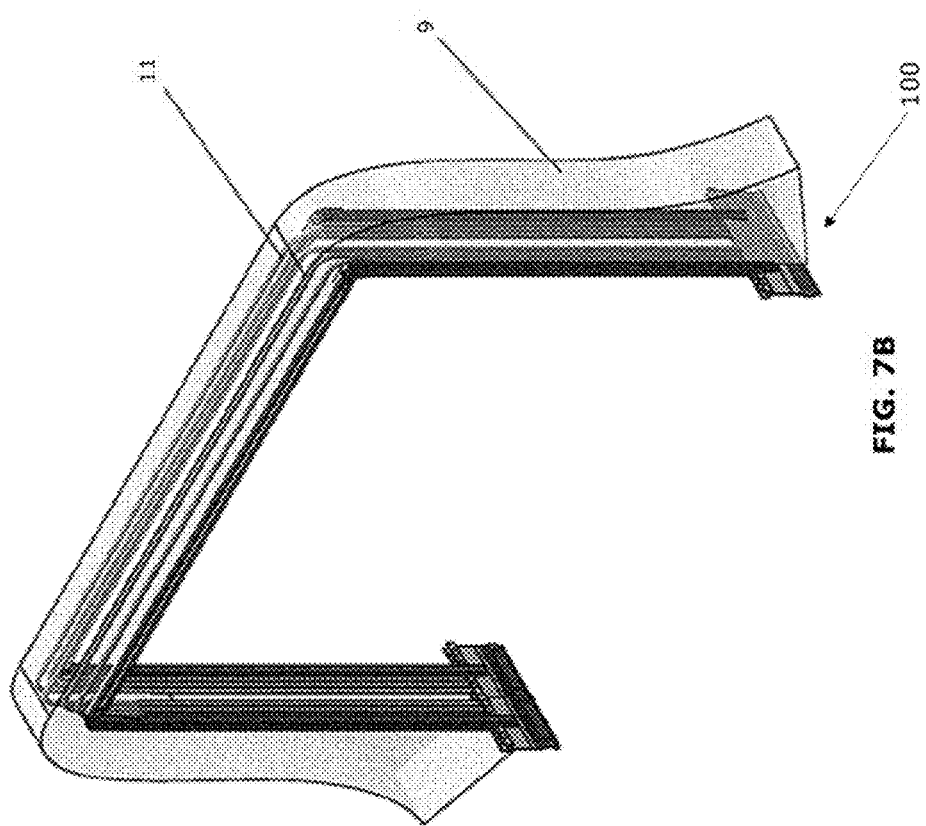
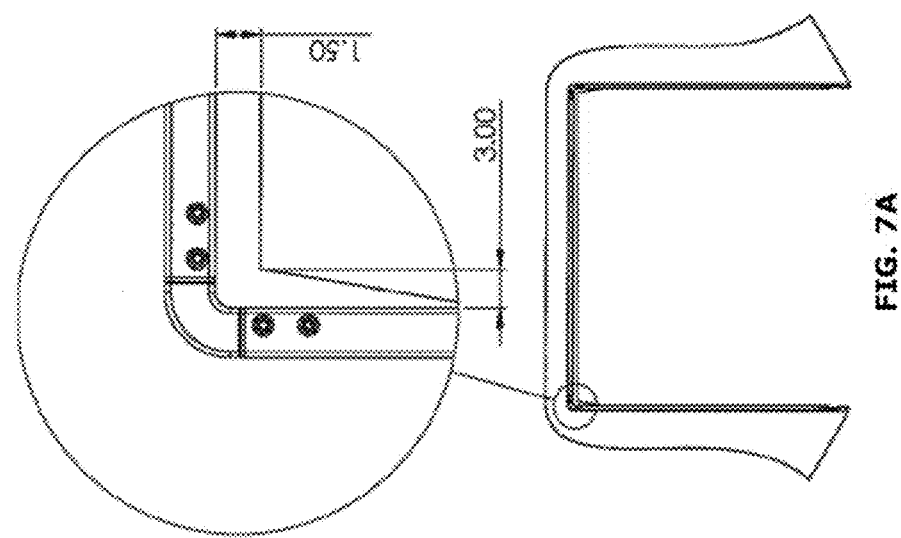
FIG. 7B
FIG. 7A

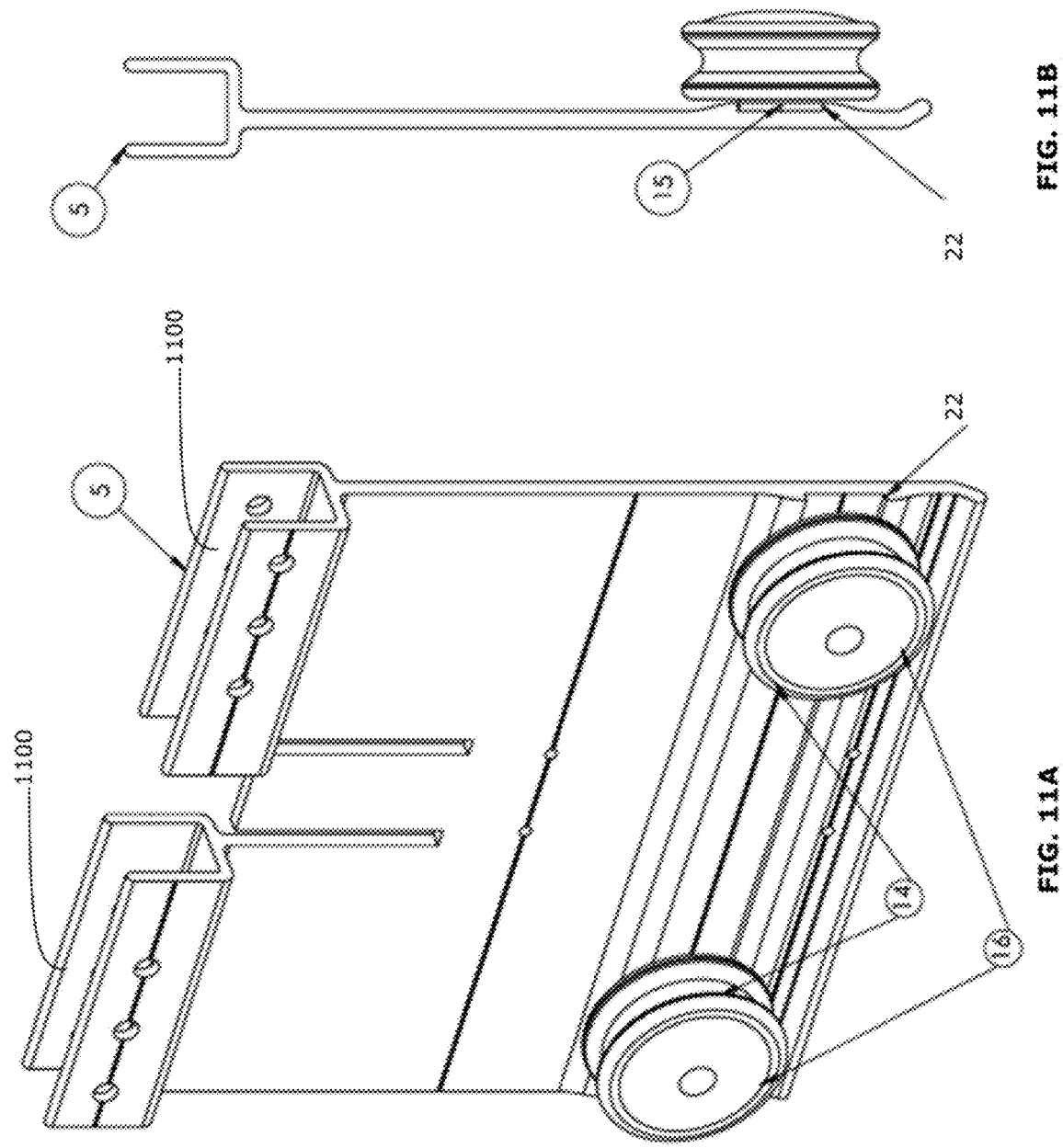

SLIDING TARPAULIN SYSTEM AND BOW LIFT ASSEMBLIES

RELATED APPLICATION(S)

This application claims the benefit of U.S. provisional application no. 62/508,480 filed May 19, 2017, the contents of which are incorporated herein in its entirety.

FIELD

The present application relates generally to tarpaulin systems for covering the beds of vehicle trailers. In particular, a bow lift system and bow lift assemblies for supporting a tarpaulin are described.

BACKGROUND

Trucks having trailers with flat beds, which are well known in the transportation industry, are commonly used for shipping goods, either locally, regionally or internationally. In order to protect goods loaded on the flat bed from exposure to the elements, vandalism or theft, the goods are typically covered with tarpaulins, or tarps.

Many types of systems exist that facilitate the covering and uncovering of a flat bed trailer with a tarp. By way of example, one type of system includes a plurality of arch-shaped frames, referred to as "cars", having wheels mounted at each end of the arch. These wheels are received by, and can slide in "C"-shaped tracks mounted on the sides of a flat bed, such that the arch of each of the cars extends over the surface of the flat bed. The cars are arranged at spaced intervals along the entire length of the flat bed, and a tarp extends over and is affixed to the arches of the cars to cover the flat bed.

The flat bed can be uncovered by sliding the car at the back of the flat bed towards the front, causing it and the other cars to gather at the front of the flat bed and the tarp to retract, exposing the flat bed. The flat bed can be re-covered by sliding the rear car toward the back of the flat bed again, causing the remaining cars to return to their original spaced apart positions and the tarp to unfurl, covering the flat bed.

SUMMARY

Disclosed herein is a bow lift system and assembly for supporting a tarpaulin. The disclosed system and assembly may achieve a larger maximum interior loading space and can be configured to support six or more uplift bows without additional brackets to the frames or car plates of the assembly.

In some aspects, the present disclosure describes an uplift bow assembly for a sliding tarpaulin. The uplift bow assembly includes
 first and second car plates;
 a frame having a center portion, a first downwardly extending frame arm connected to the first car plate at a first end of the frame, and a second downwardly extending frame arm connected to the second car plate at a second end of the frame;
 a plurality of uplift bows, each uplift bow having a center portion, a first downwardly extending bow arm pivotably connected to the first car plate, and a second downwardly extending bow arm pivotably connected to the second car plate; and
 each of the first and second car plates is configured to support the selective pivoted connection of at least five uplift bows In any of the preceding embodiments each of the first and second car plates is configured to support the selective pivoted connection of six uplift bows.

In any of the preceding embodiments the six uplift bows comprise three uplift bow pairs symmetrically arranged about the frame.

In any of the preceding embodiments each uplift bow pair comprises a different height.

In any of the preceding embodiments each car plate comprises one or more upward facing, U-shaped brackets, each bracket being configured to support the selective pivoted connection of up to three uplift bows.

In any of the preceding embodiments the centre portions and first and second bow arms of each of the uplift bows are of a one piece construction.

In another aspect, the present disclosure describes a sliding tarpaulin system that opens to convert a flat bed trailer into a fully covered trailer and closes to provide an open flat bed trailer. The system includes:
 a first track and a second track;
 a plurality of uplift bow assemblies that extend laterally across the trailer, the first and second car plates of each uplift bow assembly slideably engaging the respective first and second tracks; and
 each frame having means to secure thereto peripheral portions of tarpaulin sections for covering a bed of the trailer In any of the preceding embodiments an outer uplift bow of at least one uplift bow assembly has a hinged attachment to an outer uplift bow of an adjacent uplift bow assembly.

In any of the preceding embodiments the first and second car plates of at least one uplift bow assembly comprise one of a wheel or roller for slideably engaging the respective first and second tracks.

In any of the preceding embodiments the sliding tarpaulin system includes a front uplift bow assembly adjacent a front of the trailer. The front uplift bow assembly includes:
 first and second front car plates,
 a frame having a center portion, a first downwardly extending frame arm connected to the first front car plate, and a second downwardly extending frame arm connected to the second front car plate; and
 a plurality of uplift bows, each uplift bow having a center portion, a first downwardly extending bow arm pivotably connected to the first front car plate, and a second downwardly extending bow arm pivotably connected to the second car plate; and
 each of the first and second front car plates is configured to support the selective pivoted connection of at least three uplift bows.

In any of the preceding embodiments the sliding tarpaulin system includes a rear uplift bow assembly adjacent a rear of the trailer. The front uplift bow assembly includes:
 first and second rear car plates,
 a rear frame having a center portion, a first downwardly extending frame arm connected to the first rear car plate, and a second downwardly extending frame arm connected to the second rear car plate; and
 a plurality of uplift bows, each uplift bow having a center portion, a first downwardly extending bow arm pivotably connected to the first rear car plate, and a second downwardly extending bow arm pivotably connected to the second rear car plate; and each of the first and second front car plates is configured to support the selective pivoted connection of at least three uplift bows Directional references herein such as "front", "rear", "up", "down", "horizontal", "top", "bottom", "side" and the like are used purely for convenience of description and do not limit the scope of the present disclosure. Furthermore, any dimensions provided herein are presented merely by way of an example and unless otherwise specified do not limit the scope of the disclosure. Furthermore, geometric terms such as "straight", "flat", "curved", "point" and the like are not intended to limit the disclosure to any specific level of geometric precision, but should instead be understood in the context of the disclosure, taking into account normal manufacturing tolerances, as well as functional requirements as understood by a person skilled in the art.

BRIEF DESCRIPTION OF THE DRAWINGS

Reference will now be made, by way of example, to the accompanying drawings which show example embodiments of the present application.

FIG. 1A illustrates an open position of the tarp and bow lift system. FIGS. 1B and 1C are perspective views of the flat bed trailer, tarp and bow lift system in a collapsed position.

FIGS. 7A and 7B are front and perspective views of an intermediate bow lift assembly in a collapsed configuration.

FIGS. 11A and 11B are perspective and front views of an intermediate car plate.

Similar reference numerals may have been used in different figures to denote similar components.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention.

DESCRIPTION OF EXAMPLE EMBODIMENTS

Figure 1A:
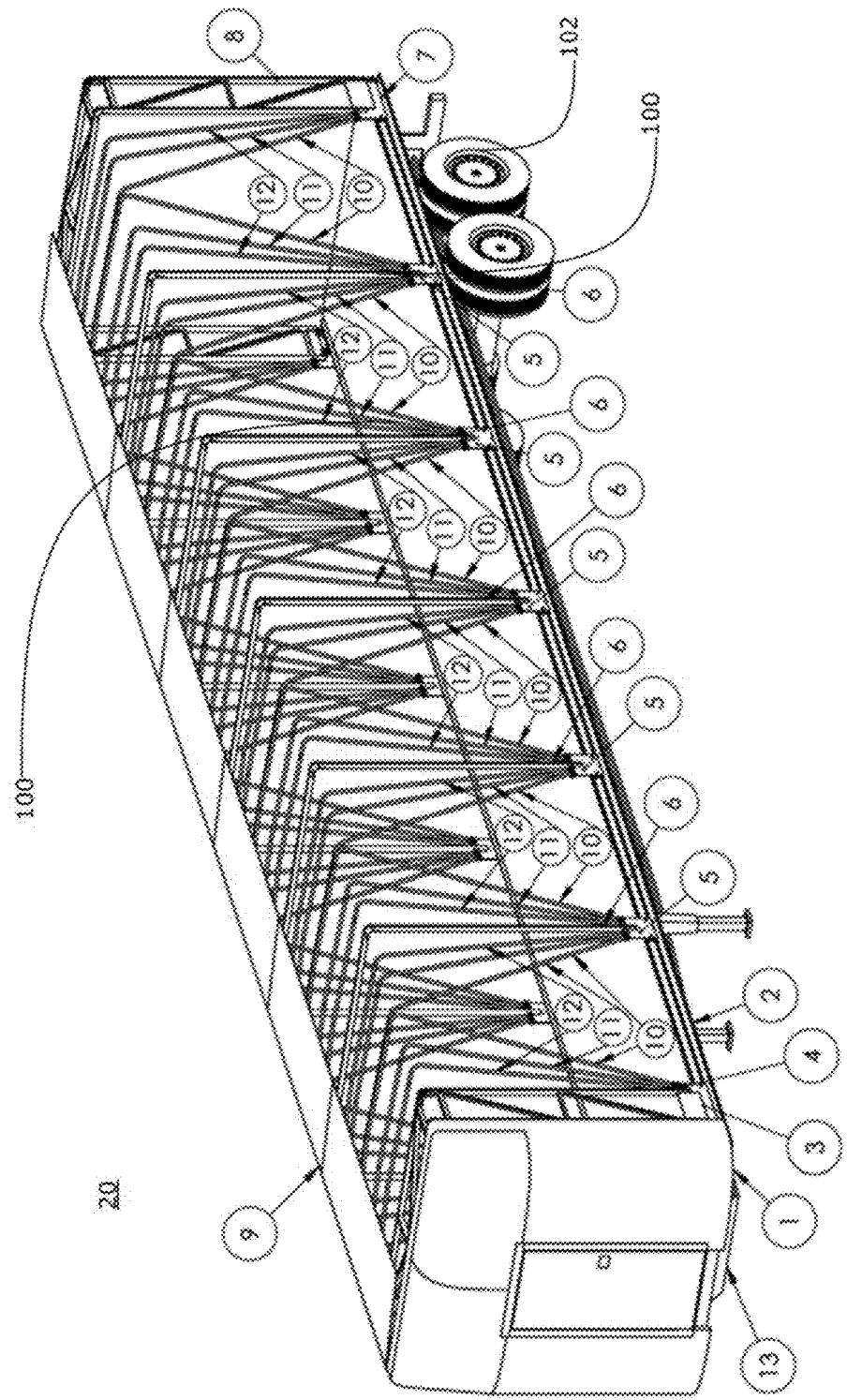
FIG. 1A is a perspective cut-away view of a flat bed trailer and tarp with a bow lift system and bow lift assemblies according to one embodiment of the present application.
Figure 1B:
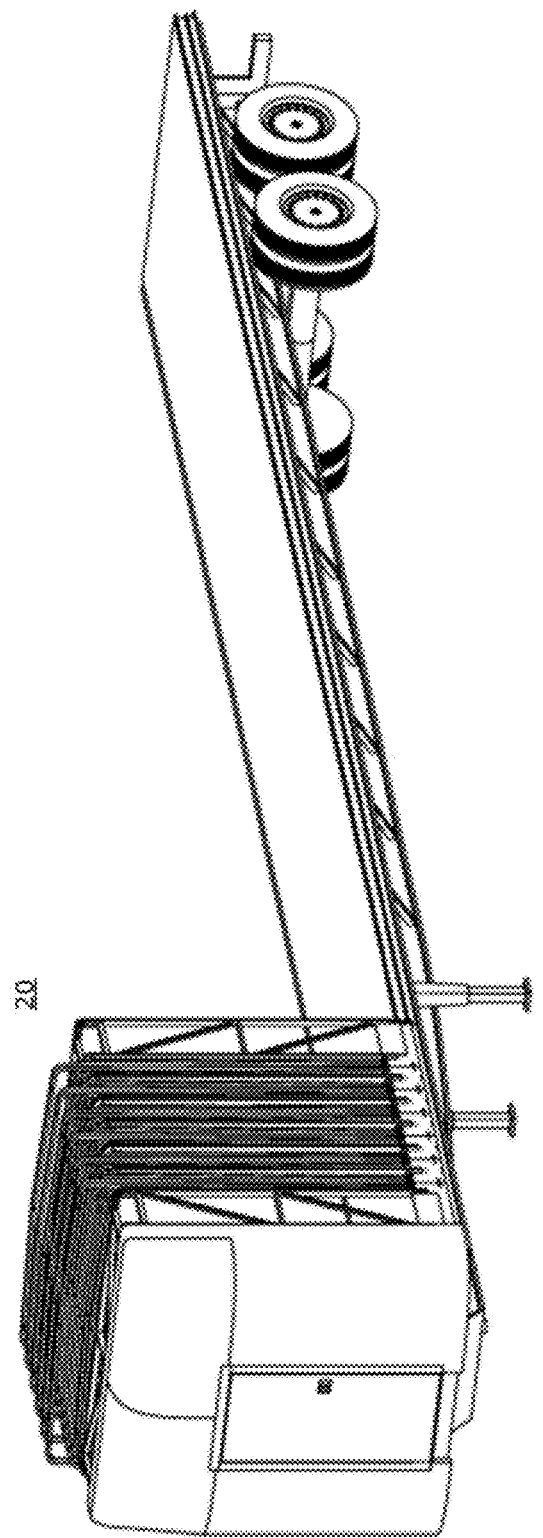

FIG. 1A illustrates a flat bed trailer 13 and one embodiment of a bow lift system shown generally as 20, and bow lift assemblies 100 for a tarpaulin (or tarp) covering system in an open position. Only a portion of the tarp 9 is showed in the cutaway view in order to show the underlying bow lift assemblies 100. The trailer 13 comprises a generally rectangular flat trailer bed having elongate left and right sides and transverse front and rear sides. The flat bed of the trailer 13 is mounted on wheels 102 at its rear end. The flat bed of the trailer 13 has generally vertical and/or horizontal "C"-shaped tracks mounted on each of its left and right sides, for example, track 2 shown in FIG. 1A. FIGS. 1B and 1C show the bow lift system 20 (without the tarp) in a collapsed position at the front of the trailer and at the rear of the trailer, respectively.

The bow lift system 20 consists of tracks 2 and a plurality of arch-shaped bow lift assemblies 100 arranged in a spaced-apart configuration along the length of the flat bed of trailer 13. Each of the assemblies 100 comprises a frame 4, 6, 8 and an end assembly known as a "car" or car plate 3, 5, 7 at each end of the frame. Specifically, the bow lift assembly 100 at the front of the flatbed of trailer 13 consists of a front car frame 4 connected at opposed ends to a front car plate 3. The bow lift assembly 100 at the rear of the flatbed of trailer 13 consists of a rear car frame 8 connected at opposed ends to a rear car plate 7. The middle or intermediate bow lift assemblies 100 each consist of an intermediate car frame 6 connected at opposed ends to an intermediate car plate 5. Each car plate 3, 5, 7, includes a roller or wheel, as described further below, which engages the tracks 2 such that the bow lift assemblies 100 and tarpaulin 9 may slide along the track 2 to cover or uncover the flat bed of trailer 13.

Each frame 4, 6, 8 includes a horizontal center portion 24, 26, 28 and two arms 34, 36, 38 extending downwardly from ends of the center portion. Each arm terminates in a connection to a respective car plate. The frames 4, 6, 8, include means to secure thereto peripheral portions of tarpaulin 9 sections for covering the trailer 13. The frames 4, 6, 8, may be constructed as one piece or may include separate center portions which are connected to the arms with separate corner members.

As shown in FIG. 1A, each car plate 4, 6, 8, is configured to support up to six uplift bows, 10, 11, 12 which are pivotably attached to the car plates 3, 5, 7. Each uplift bow 10, 11, 12, has a respective top or center portion 30, 31, 32 and two opposed arms 40, 41, 42 respectively, extending downwardly from the ends of the respective center portions. Each arm 40, 41, 42, terminates in a pivoted connection to the respective car plate 3, 5, 7. The uplift bows 10, 11, 12, may be constructed as one piece or may consist of one or more sections connected to create the uplift bow.

In one embodiment, pairs of uplift bows 10, 11, 12 may be deployed symmetrically and centered about the frame 4, 6, or 8. As the bow lift assemblies 100 are deployed and slid or rolled and spaced apart along the track 2 of the bed of trailer 13, each uplift bow 10, 11, 12, pivots outwardly from the frame 4, 6, or 8. The uplift bows 10, 11, 12 extend at different angles from the frame 4, 6, or 8 such that centre portions 30, 31, 32, of the uplift bows 10, 11, 12 and the center portions 24, 26, 28 of the frames 4, 6, 8, rest in substantially the same plane. The frames and uplift bows are spaced apart, as seen in FIG. 1A, to support the tarpaulin 9 and define an interior cube or covered load space on the trailer bed. The tarpaulin 9 may be removably attached to each of the frames 4, 6, 8, and the uplift bows 10, 11, 12.

According to embodiments described herein, by mounting one, two or three pairs of uplift bows, a double, quad or hex bow lift assembly may be created. For reference herein, an uplift bow assembly 100 with only uplift bows 10 may also be referred to as double uplift bows; a system that includes uplift bows 11 may also be referred to as quad uplift bows; and a system that further includes uplift bows 12 may also be referred to as hex uplift bows. With three pairs of uplift bows in particular, the tarpaulin system 20 is provided with better side wind load and top snow and water load bearing capabilities. The amount or depth of tarp that sags into the loading area of the trailer bed also is decreased. Thus, a tarpaulin system 20 may be initially configured with two or double uplift bows and then upgraded to a quad or hex system if load requirements change from smaller or shorter loads to larger or taller loads which max out the interior cube defined by the deployed tarp system.

Figures 2A, 2B:
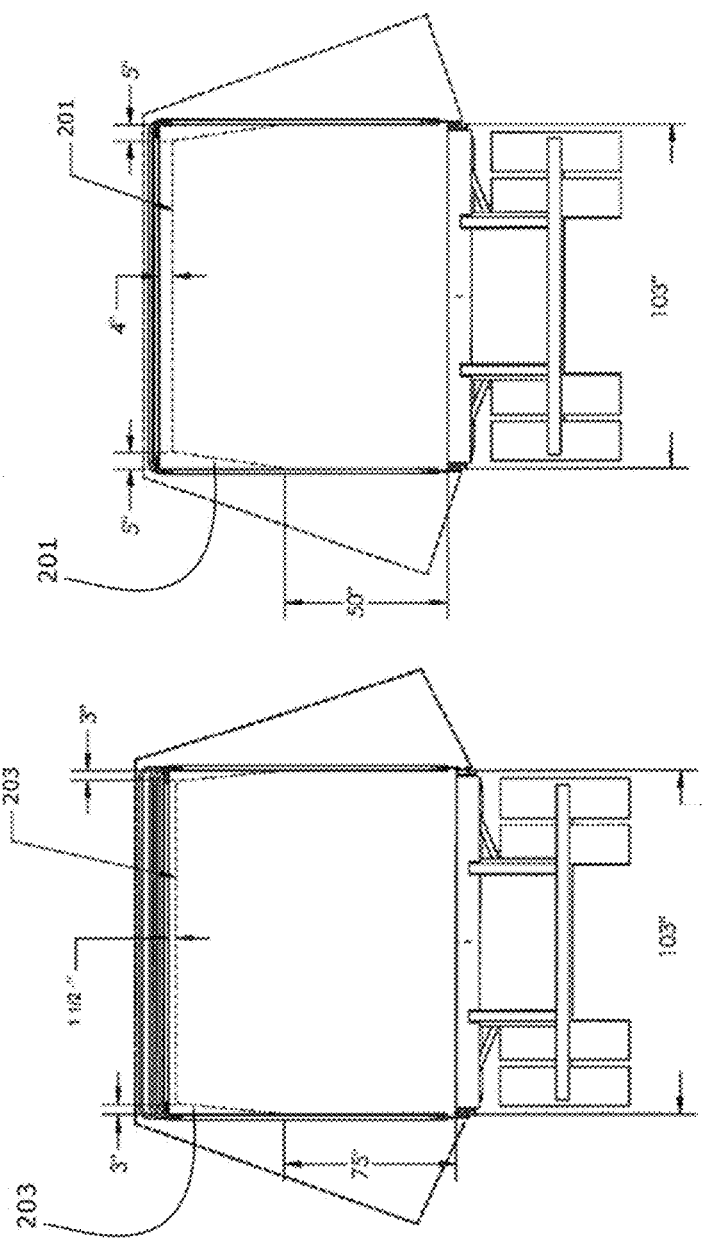
FIG. 2A illustrates a rear view of a trailer and tarp system known in the prior art.
FIG. 2B illustrates a rear view of a trailer and tarp system according to one embodiment of the present application.

FIG. 2A, for example, illustrates a conventional tarp system with an inside load clearance of approximately 103 inches and a panel size of approximately 86 inches, and with two or four uplift bows. Line 201 shows the tarp pleating which starts approximately 50 inches above the trailer bed. The tarp also falls downward at the top by 4 inches, and downward at the corners by 5 inches if a total of four uplift bows are installed. If only two uplift bows are installed, the tarp may fall downward at the top and at the corners by as much as 9 to 12 inches. As a result, the tarp encroaches on the interior of the covered trailer bed and reduces the possible load volume as the tarp drags over the load. FIG. 2B illustrates an uplift system according to the present application with 6 uplift bows in which Line 203 shows tarp pleating and which otherwise has substantially the same dimensions as a conventional system. This illustrates one example where, with six uplift bows, interior tarp pleating starts about 75 inches above the trailer bed, thus providing additional 25 inches of internal height clearance. In this example, the tarp falls downward at the top and corners by only 1.5 and 3 inches respectively. Thus, the possible or usable load volume increases and this also results in less tarp falling into the loading area and being damaged as a result.

Figure 3:
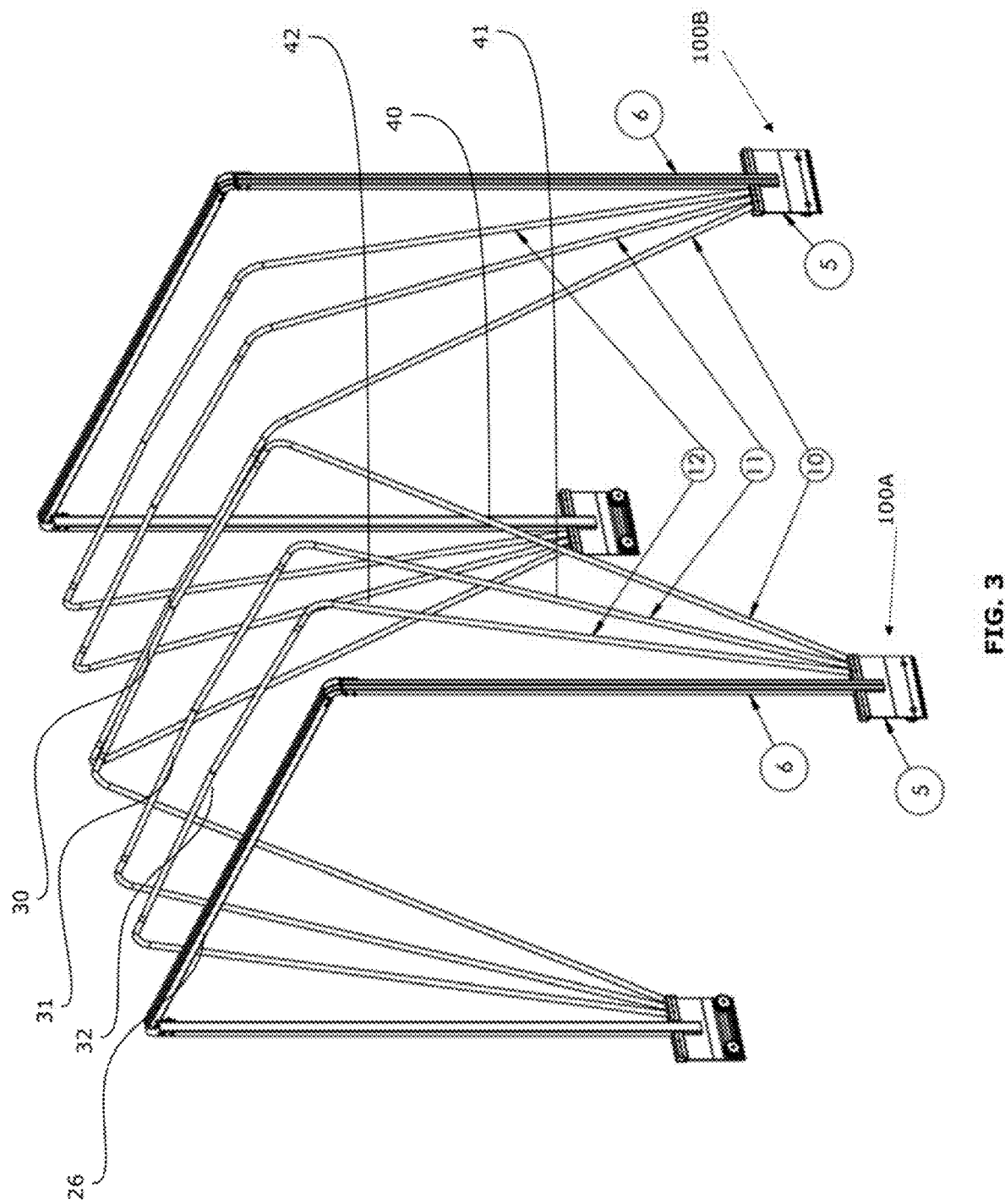
FIG. 3 is a perspective view of portions of two intermediate bow lift assemblies according to one embodiment of the present application.

FIG. 3 illustrates one embodiment showing portions of two bow lift assemblies 100A, 100B with only one half of the three pairs of uplift bows 10, 11, 12 shown. In this embodiment, the outer or double uplift bow 10 may be attached at or along its top center portion 30 to the outer or double uplift bow 10 of the adjacent bow lift assembly 100B. In one embodiment, the two outer uplift bows 10 are hinged together by hinge means known in the art. Each uplift bow 10, 11, 12 is configured with a length and pivoting attachment to the car plate such that when the bow lift assemblies are expanded, the respective connecting frames and uplift bows are spaced apart along the top plane of the trailer to support the tarp. The roof panel of the tarp is effectively divided into six separate sections which are supported by the uplift bows described herein.

Figure 4:
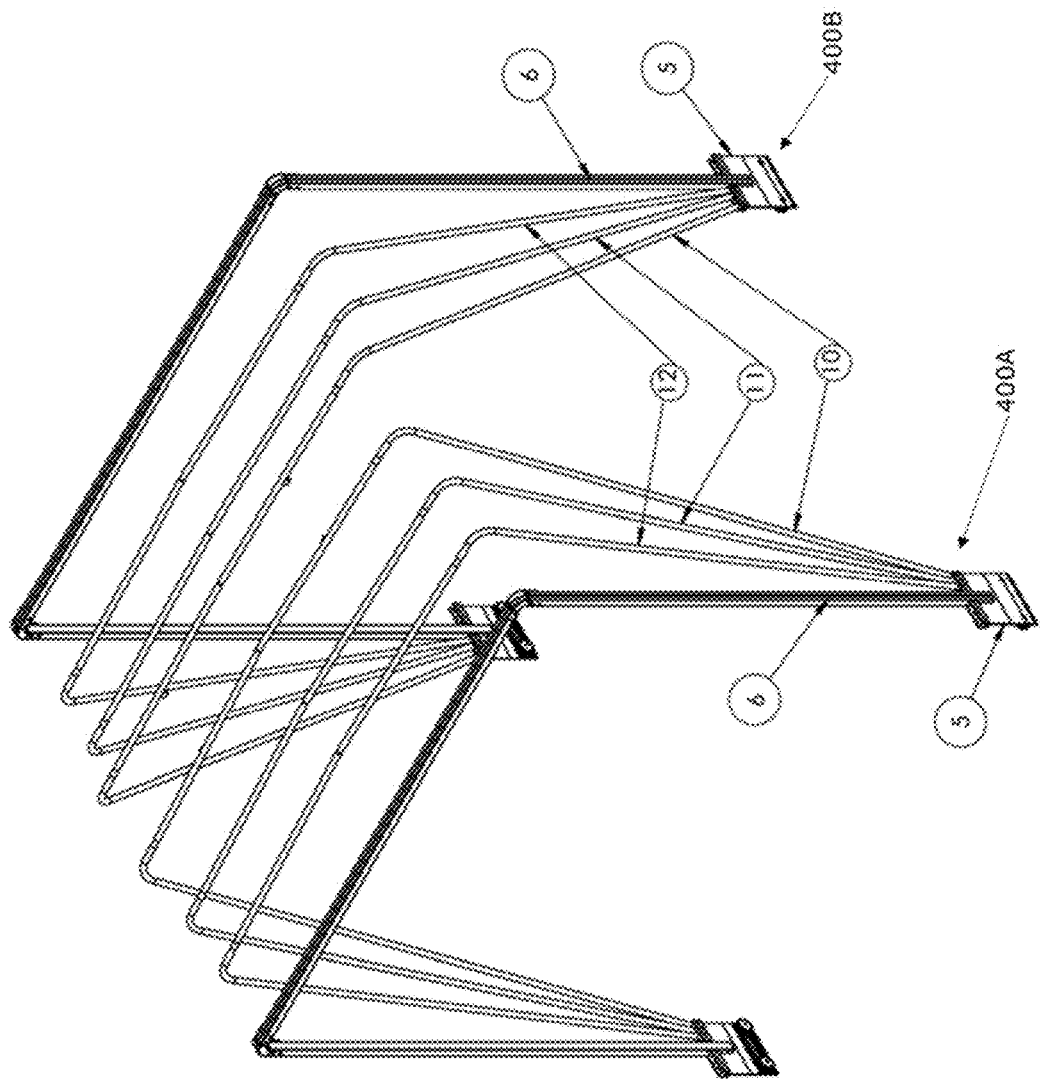
FIG. 4 is a perspective view of portions of two intermediate bow lift assemblies according to another embodiment of the present application.

FIG. 4 illustrates another embodiment again showing only one half of the three pairs of uplift bows 10, 11, 12. The hex uplift system may be provided with separate bow lift assemblies 400A, 400B in which the outer or double uplift bows 10 are not attached. Each uplift bow 10, 11, 12 is configured with a length and pivoting attachment to the car plate such that when the bow lift assemblies are expanded, the frames and uplift bows are spaced apart along the top plane of the trailer to support the tarp. The roof panel of the tarp is effectively divided into seven separate sections which are supported by the uplift bows. While the example embodiments are described and illustrated showing pairs of uplift bows, pairs are not required.

The tarp system 20 also may be configured with an odd number of uplift bows provided on each assembly 100, 400 and thus with odd or even numbers of uplift bows between adjacent assemblies 100. For example, either embodiment shown in FIG. 3 or 4 may be provided with 5 uplift bows between the bow lift assemblies 100A, 100B and 400A, 400B. The roof panel of the tarp 9 is then effectively divided into five or six separate sections which are supported by the uplift bows.

Figure 5:
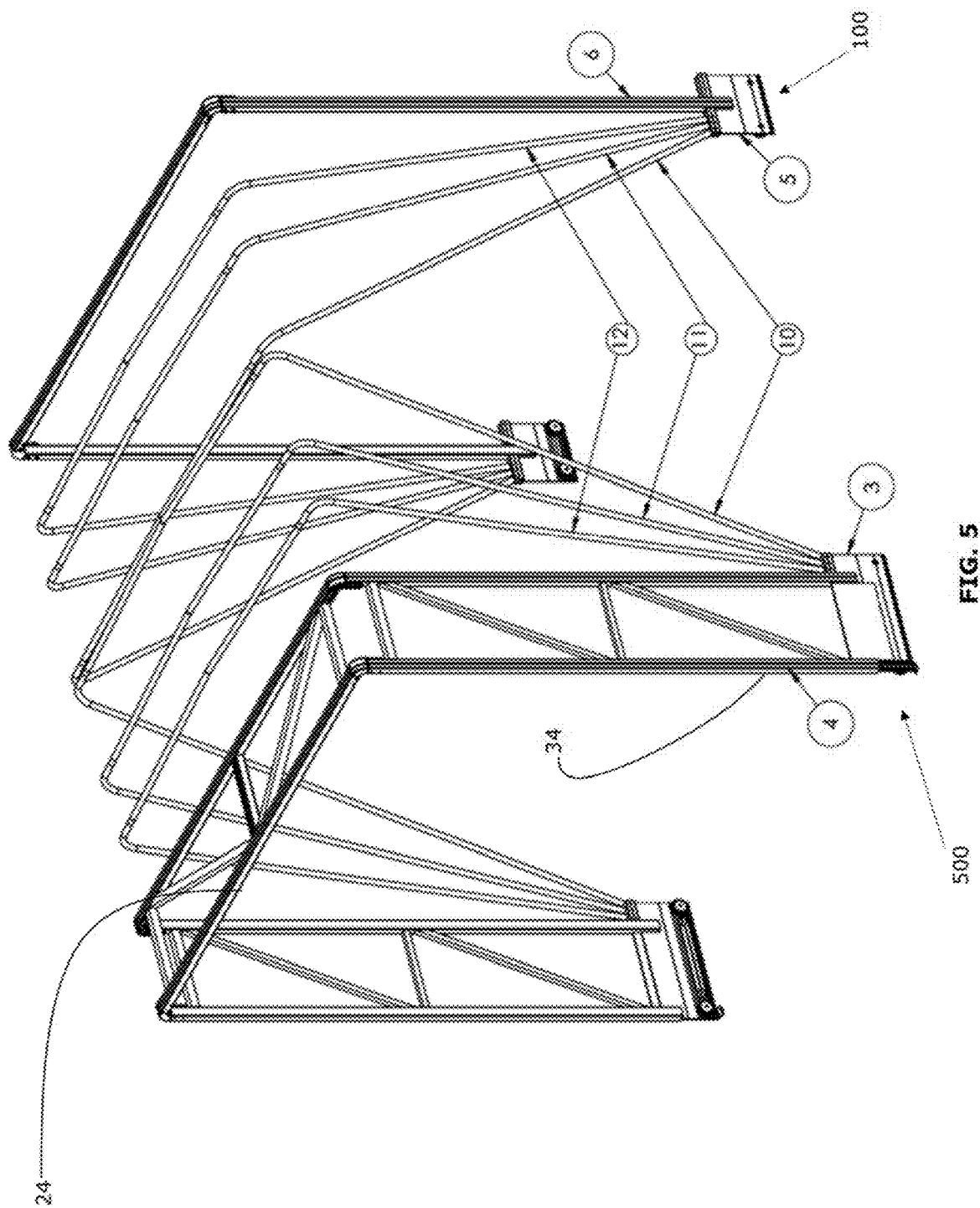
FIG. 5 is a perspective view of a front bow lift assembly and a portion of an intermediate bow lift assembly.
Figure 6:
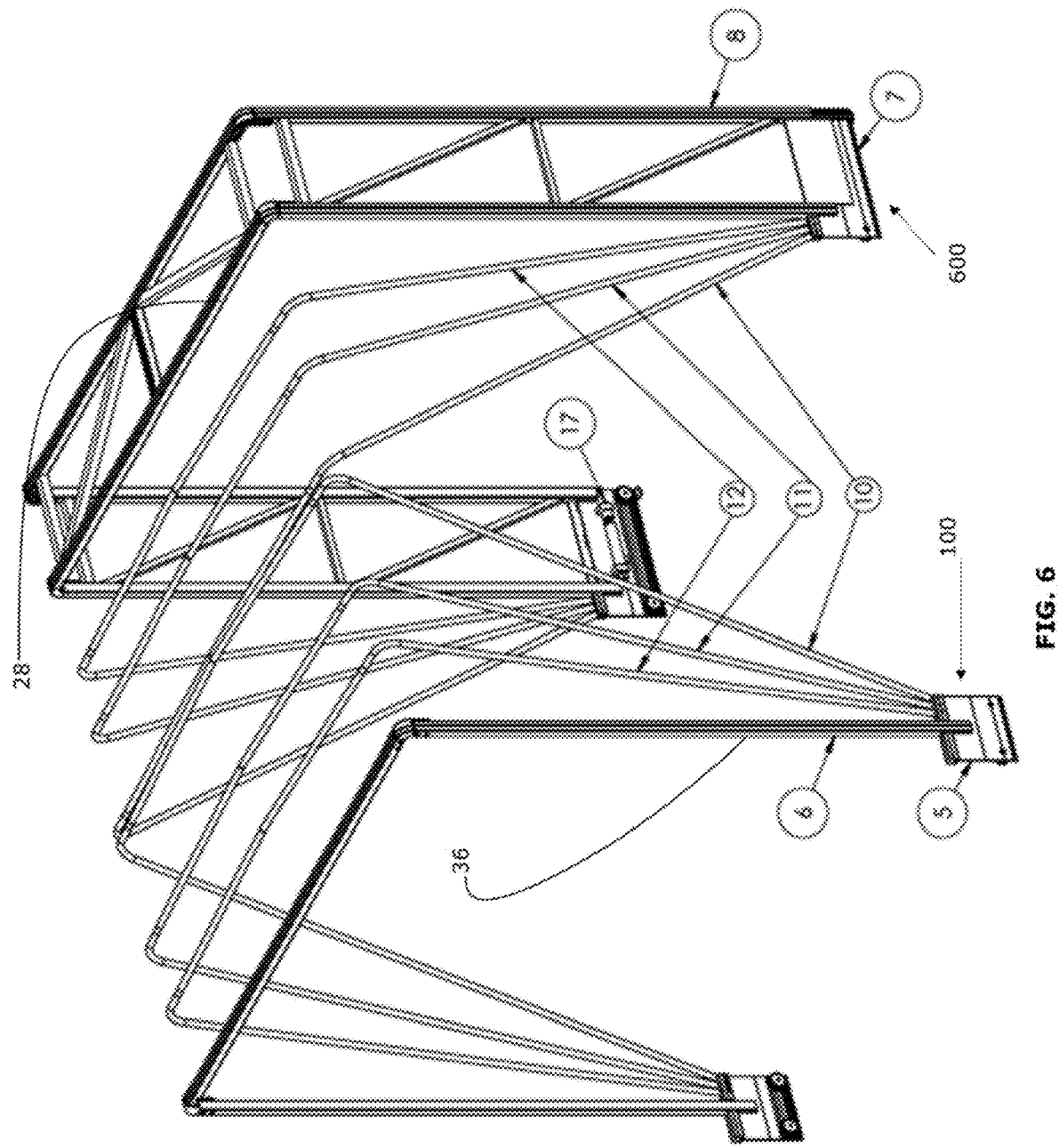
FIG. 6 is a perspective view of a rear bow lift assembly and a portion of an intermediate bow lift assembly.

As seen in FIGS. 3, 5 and 6, different cooperating pairs of bow lift assemblies 100 may be configured. FIG. 3, described above, shows a configuration between two bow lift assemblies 100 with intermediate car plates 5 and intermediate car frames 6. FIG. 5 illustrates a bow lift assembly 500 which is configured to be deployed at the front of the trailer bed with a front car plate 3 and a front car frame 4. The outer uplift bow 10 of the assembly 500 may be attached to the outer uplift bow 10 of the adjacent bow lift assembly 100. FIG. 6 illustrates a bow lift assembly 600 which is configured to be deployed at the rear of the trailer bed with a rear car plate 7, a front car frame 8, and a locking component 17 for locking the car plate 7 to a downwardly extending arm of the frame 8. The outer uplift bow 10 of the assembly 600 may be attached to the outer uplift bow 10 of the adjacent bow lift assembly 100 by hinge means or other attaching means. FIGS. 7A and 7B illustrate a collapsed section of the tarp system and the bow lift assemblies of FIG. 3.

Figure 8:
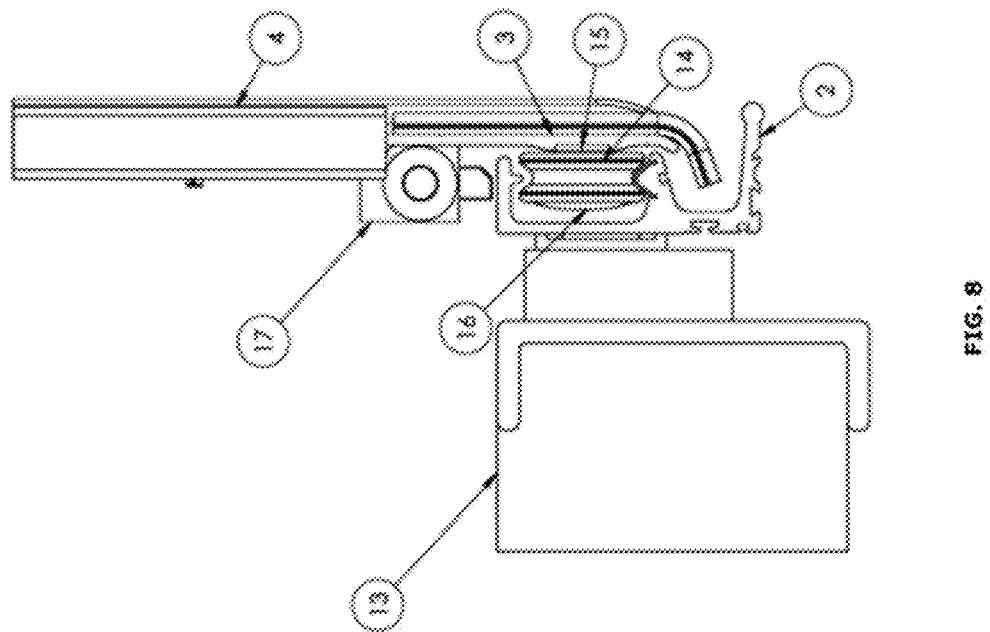
FIG. 8 is an end view of a lower portion of a car frame system and track mounted to a side rail of the trailer.
Figure 9B:
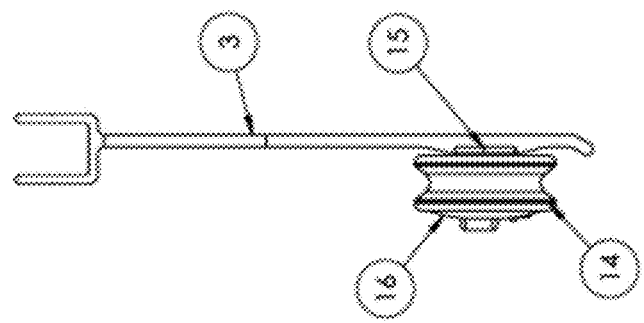
FIGS. 9A and 9B are perspective and front views of a front car plate.
Figure 9A:
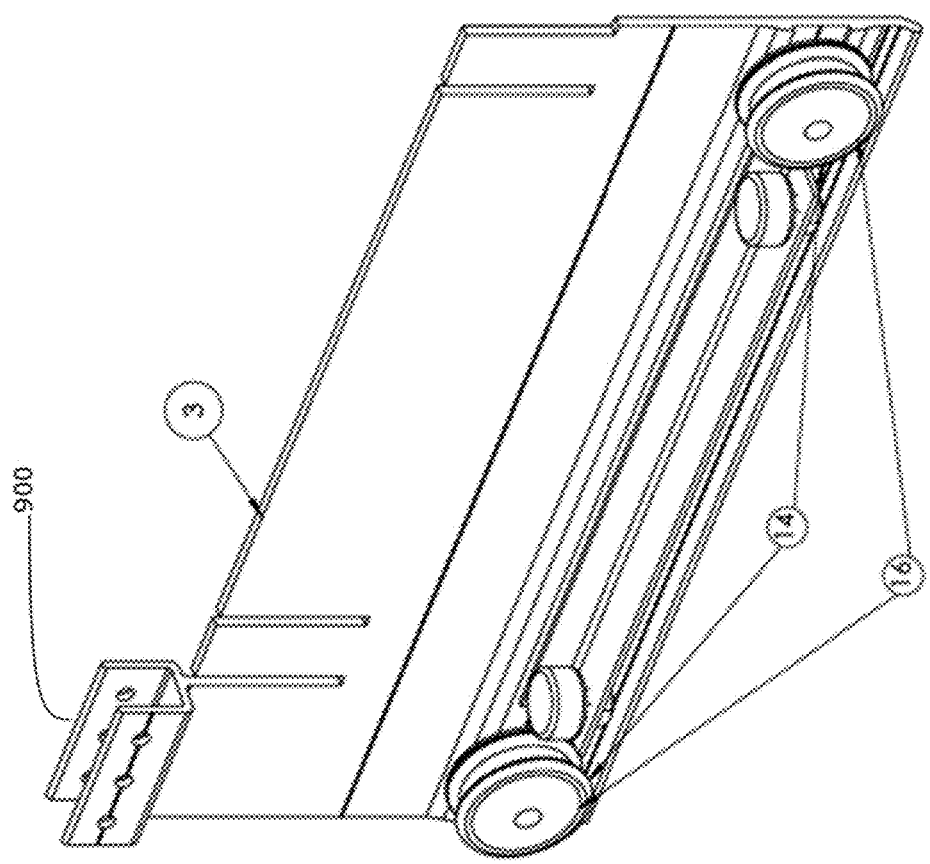
Figure 10B:
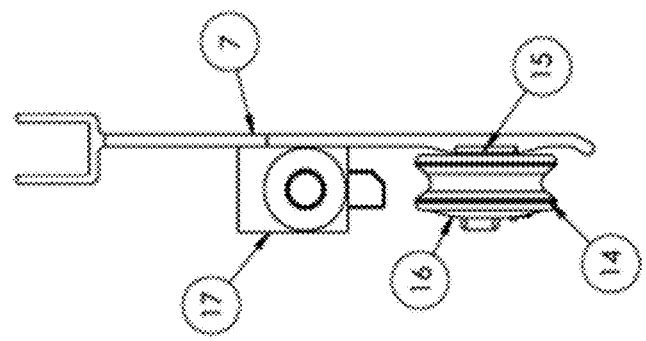
FIGS. 10A and 10B are perspective and front views of a rear car plate.
Figure 10A:
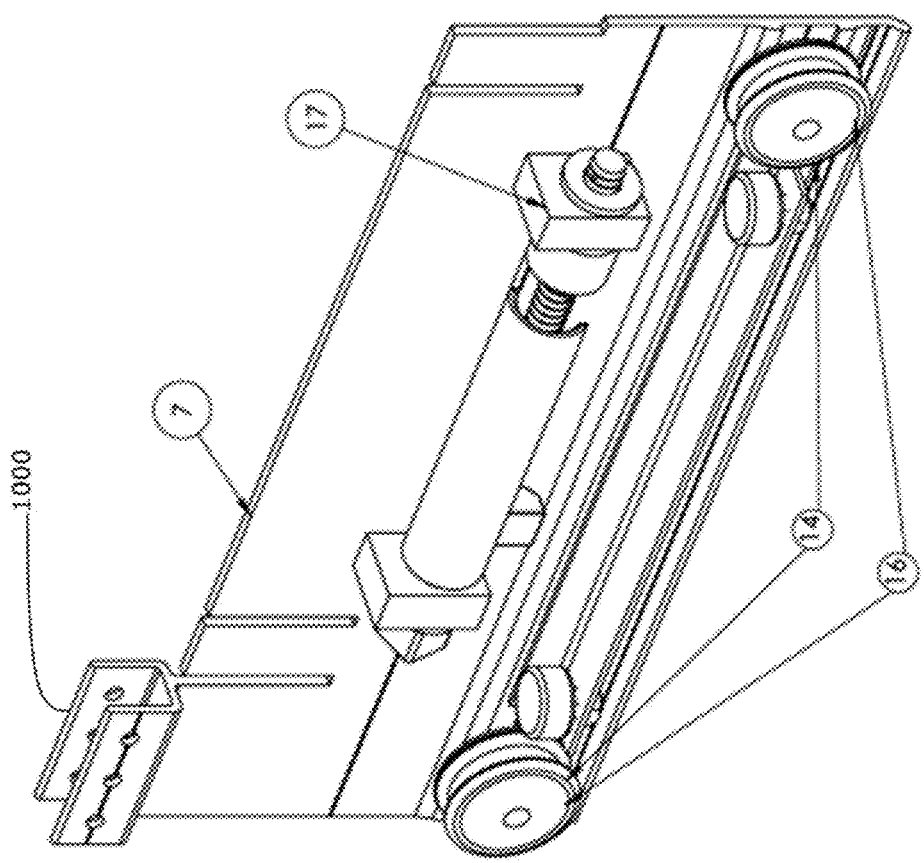

FIG. 8 illustrates a front view of a portion of the bow lift assembly 100, including the front car plate 3 and front car frame 4, and its attachment to the trailer 13 through the track 2. FIGS. 9, 10 and 11 illustrate perspective and front views of each of the front car plate 3, rear car plate 7, and intermediate car plate 5, respectively. Specifically, FIGS. 9A and 9B illustrate a front car plate 3 which is mounted to the track 2 at the front and on a driver's side of the trailer 13. FIGS. 10A and 10B illustrate a rear car plate 7 which is mounted to a track (not shown) at the rear and on a passenger or curb side of the trailer 13. One or more rollers or wheels 14 are affixed to one side of each plate for mounting the plate into the track 2. Each plate can thus slidably move along the length of the trailer bed. The wheels are received in and retained by the generally C-shaped track 2 as shown in FIG. 8 for the front car plate. The intermediate car plates and the rear car plate are mounted to the track 2 in a similar manner.

The front car plate and rear car plate each have a generally U-shaped, upward facing uplift bracket 900, 1000 at a top outer edge of the plate for receiving and attaching the one or more uplift bows 10, 11, 12. The intermediate car plate 5 includes two similar uplift brackets 1100 as shown in FIG.

11. The uplift brackets may be formed, extruded, or cast with each car plate as one piece, or the uplift brackets may be attached to the car plate, such as with a welded attachment. Each bracket defines a channel for receiving one, two or three uplift bows allowing the bows to be anchored to the car plate and thus anchored closer to the trailer bed. Instead of having the uplift bows attached to the frames, the present application provides for attachment of the uplift bows and the car frames to the car plate. A side panel of each uplift bracket may define attachment points, such as the holes shown in FIGS. 9, 10 and 11, for pivotally attaching the uplift bows 10, 11, 12. Multiple attachment points may be provided and as described above, the bow lift assembly may be configured with a selected number of uplift bows attached to the car plate. As shown in FIG. 11, the car plate 5 may also include a slot 22 to guide the wheel spacer 15.

Figure 12B:
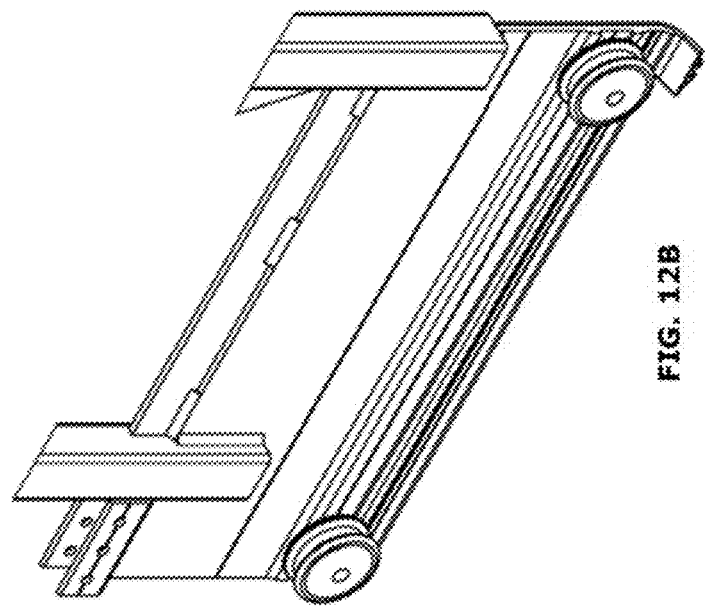
FIGS. 12A and 12B are perspective views of the front and rear car plates, respectively, showing an attachment of the frame.
Figure 12A:
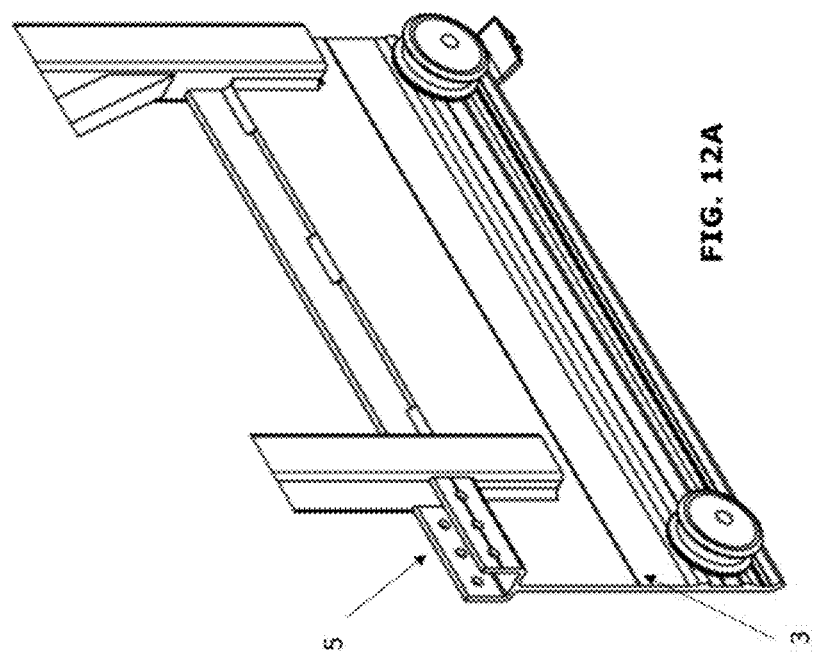

FIG. 12A illustrates the connection of the front car frame 4 to the front car plate 3 and FIG. 12B illustrates the connection of the rear car frame 8 to the rear car plate 7. The locking component 17 illustrated in FIG. 10A is not shown in FIG. 12B. As seen in FIGS. 9 to 11, each car plate may define two slots 22 which engage edges of the car frame. The arm of each car frame may terminate in a channel or hollowed portion or spacer 15 which slides into the slots and engages the car plate. Each car frame may be affixed to the car plate by welding. In other embodiments, the car frames may be bolted to the car plates. A similar connection (not shown) may be made by the intermediate car frame engaging the intermediate car plate.

Figure 13:
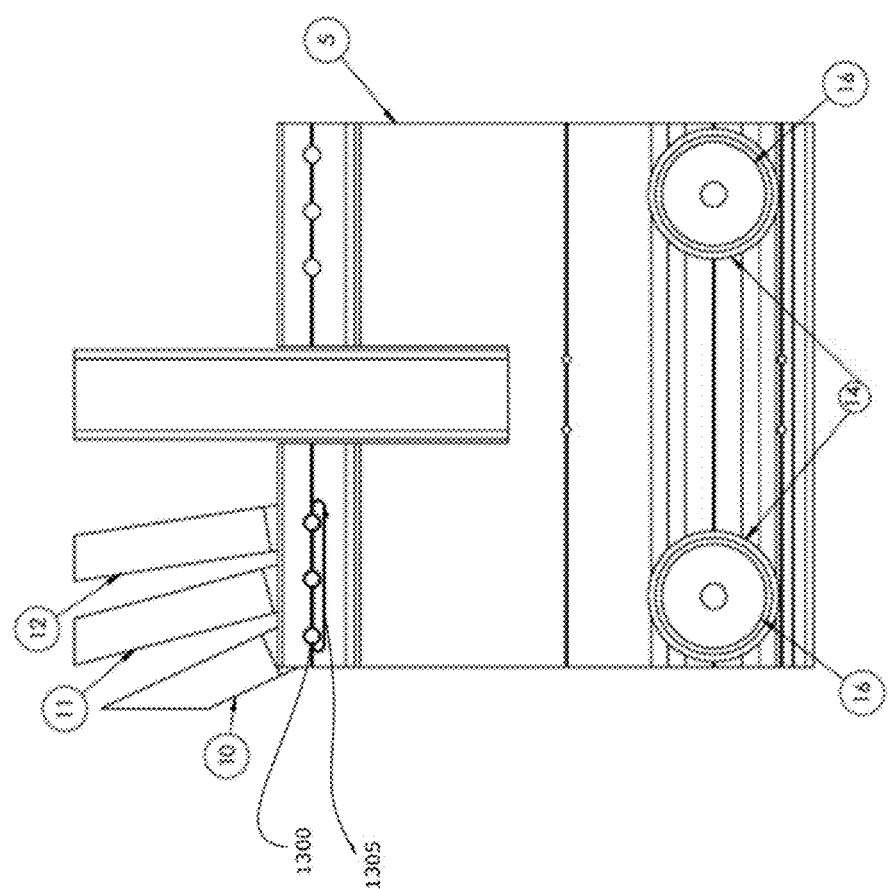
FIG. 13 is a side view of an intermediate car plate and intermediate car frame.
Figure 14B:
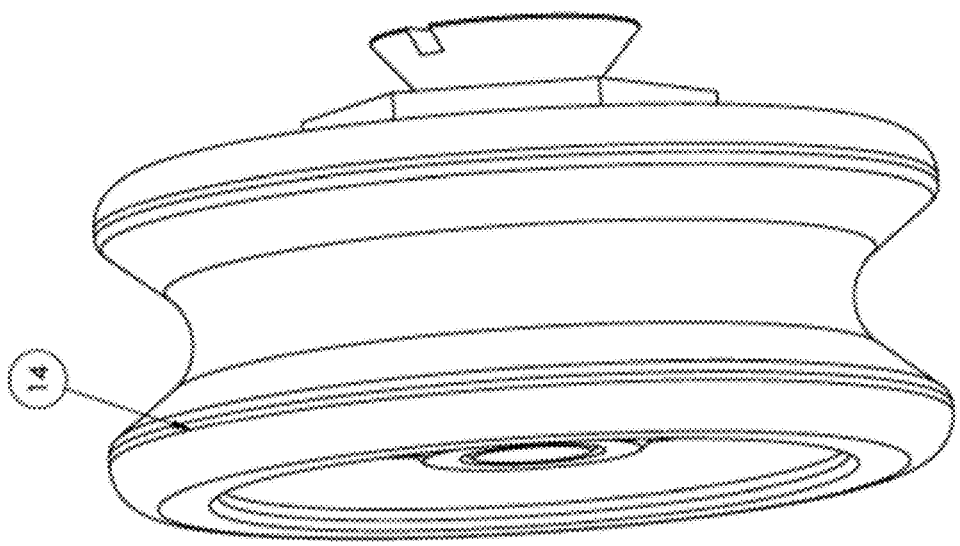
FIG. 14B is a perspective view of the wheel with the cap removed.
Figure 14A:
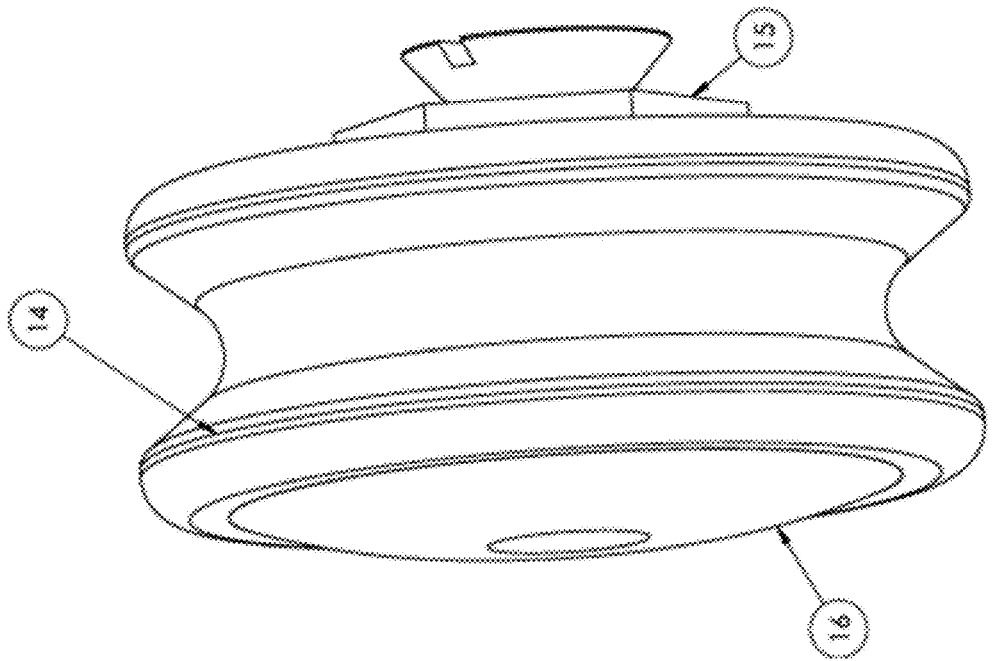
FIG. 14A is a perspective view of a wheel and cap in accordance with one embodiment of the present application.
Figure 15D:
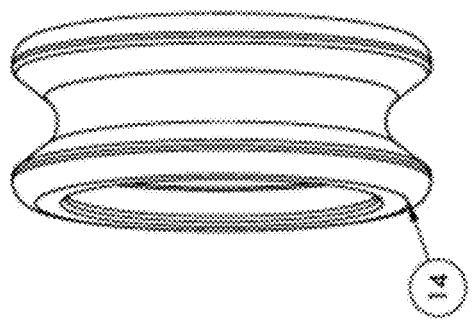
FIGS. 15A to 15D provide additional side, front and perspective views, respectively of the wheel.
Figure 15H:
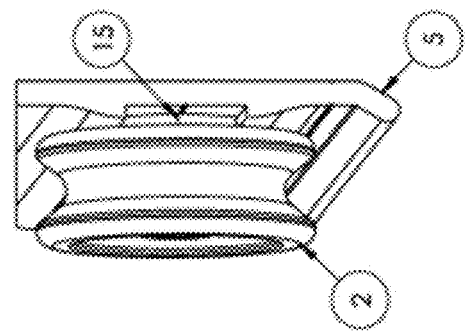
FIGS. 15E to 15H provide additional front, side and perspective views, respectively, of the wheel with a spacer mounted to a track.
Figure 15C:
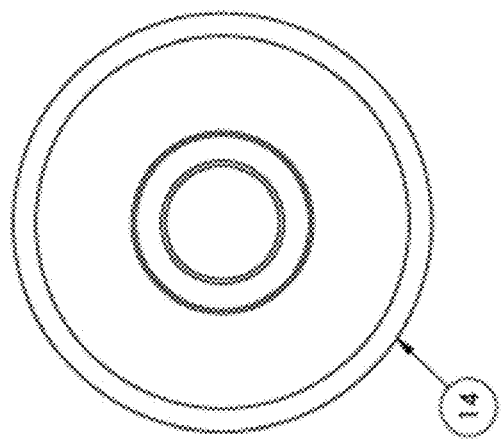
Figure 15G:
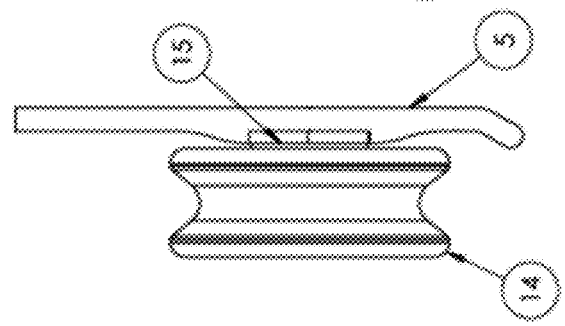
Figure 15B:
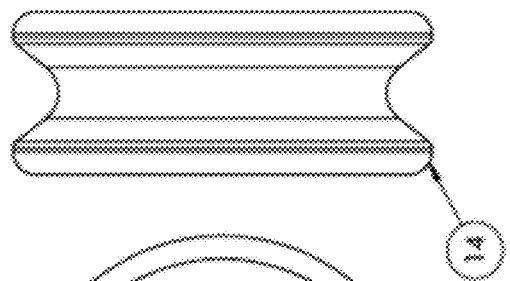
Figure 15F:
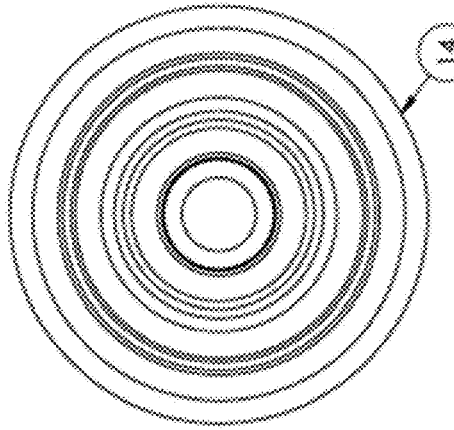
Figure 15A:
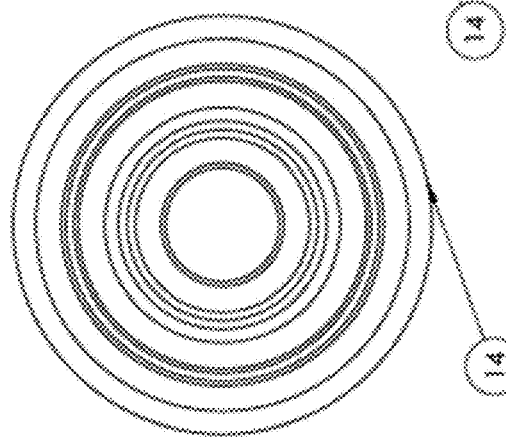
Figure 15E:
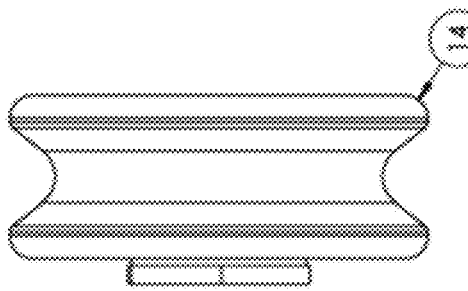
Figure 16C:
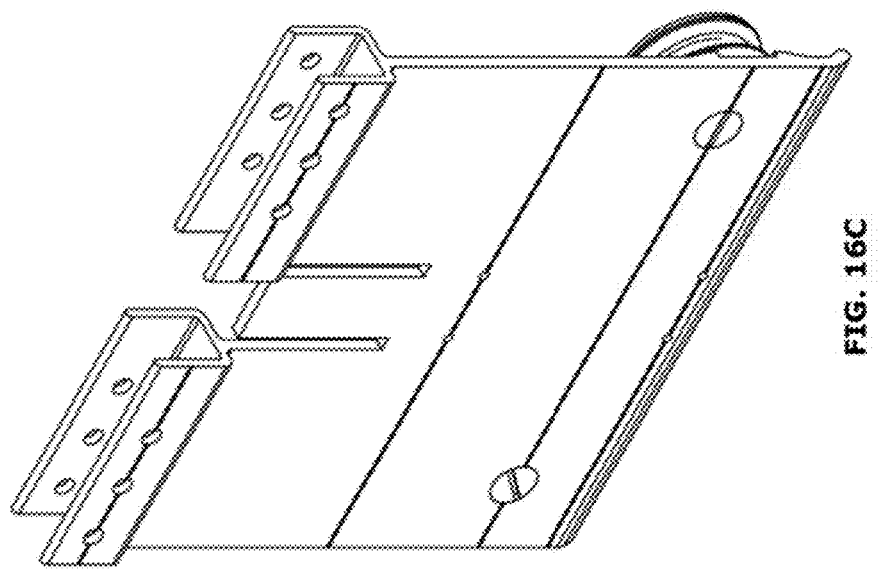
FIG. 16B is a side view thereof and FIG. 16C is a rear perspective view thereof.
Figure 16B:
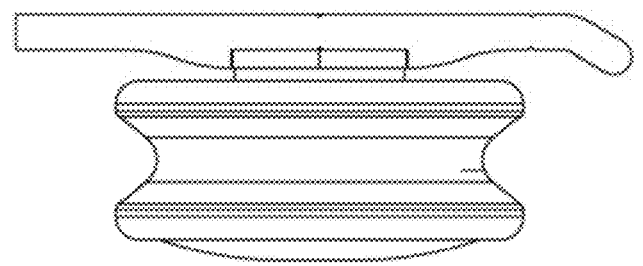
Figure 16A:
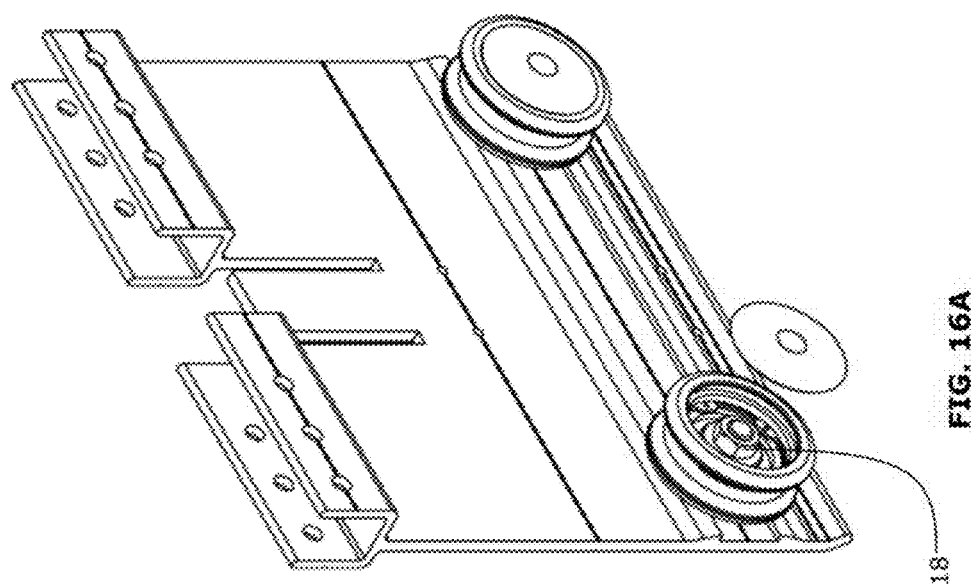
FIG. 16A is a front perspective view of the wheels mounted on the carplate, with one of the caps removed.
Figure 17:
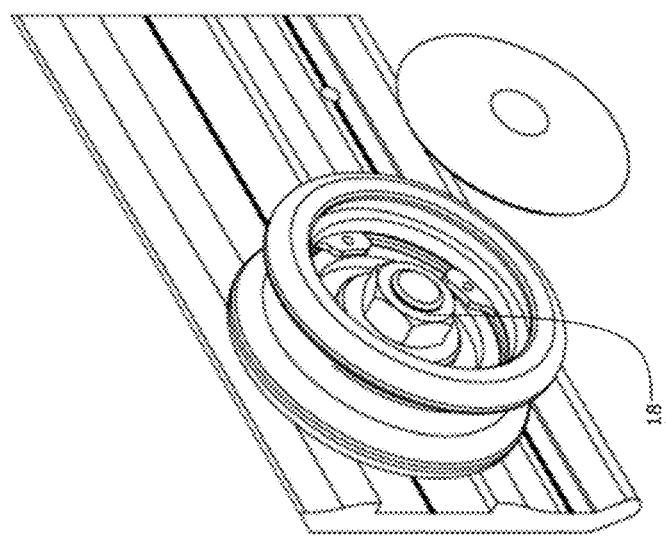
FIG. 17 is a detail view of a portion of the car plate with a wheel mounted thereon and the cap removed.

FIG. 13 illustrates a side view of an intermediate car plate 5 showing the connection of three uplift bows 10, 11, 12 to the uplift bracket 1100. Each uplift bow may be fixed to the car plate with a mechanical means such as a bolt or a hitch pin 1300. Each hitch pin may define an opening at an end which protrudes slightly from the uplift bracket 1100. A cotter pin 1305 may be threaded through each opening as shown in FIG. 13 and then fastened to secure the hitch pins 1300 to the car plate. As a result, the uplift bows 10, 11, 12 are secured and pivotably connected to the car plate.

FIGS. 14 to 17 illustrate additional views of the wheel 14 according to embodiments of the present disclosure. As shown, the wheel may comprise a v-groove wheel. The wheel 14 is connected to the car plate as shown in the Figures by mounting the wheel 14 to car plate 5 at a lower end of the car plate 4. The wheel 14 defines a cavity for receiving a bolt and nut (collectively 18) to connect the wheel 14 to the car plate 5. This design allows for the nut to be encapsulated into the wheel cavity. A cap 16 is provided to close the cavity and protect the wheel 14 and nut and bolt 18 from dirt, water, weather and other elements on the road. The cap may be sealed to the wheel 14. Attaching means other than nut and bolt 18 may be used such as screws, hinges, or pins. The cap may be made of metal or plastic and will offer prolonged life and rolling performance to the system. It also provides improved access to the securing bolt without the risk of the bolt backing out as is possible in prior art systems.

It will be apparent to those having ordinary skill in the art that certain adaptations and modifications of the described embodiments can be made, consistent with and without departing from the present invention. Unless otherwise indicated, the embodiments described herein shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein. Accordingly, the specification and the embodiments disclosed therein are to be considered exemplary only.

The invention claimed is:

1. An uplift bow assembly for a sliding tarpaulin, the uplift bow assembly comprising:
   first and second car plates,
   a frame having a center portion, a first downwardly extending frame arm connected to the first car plate at a first end of the frame, and a second downwardly extending frame arm connected to the second car plate at a second end of the frame; and
   a plurality of uplift bows, each uplift bow having a center portion, a first downwardly extending bow arm pivotably connected to the first car plate, and a second downwardly extending bow arm pivotably connected to the second car plate;
   wherein each of the first and second car plates is configured to support the selective pivoted connection of at least five uplift bows.

2. The uplift bow assembly of claim 1, wherein each of the first and second car plates is configured to support the selective pivoted connection of six uplift bows.

3. The uplift bow assembly of claim 2, wherein the six uplift bows comprise three uplift bow pairs symmetrically arranged about the frame.

4. The uplift bow assembly of claim 3 wherein each uplift bow pair comprises a different height.

5. The uplift bow assembly of claim 1 wherein each car plate comprises one or more upward facing, U-shaped brackets, each bracket being configured to support the selective pivoted connection of up to three uplift bows.

6. The uplift bow assembly of claim 1 wherein the centre portions and first and second bow arms of each of the uplift bows are of a one piece construction.

7. The uplift bow assembly of claim 1 wherein each of the plurality of uplift bow is spaced apart and separate.

8. A sliding tarpaulin system that opens to convert a flat bed trailer into a fully covered trailer and closes to provide an open flat bed trailer, the system comprising:
   a first track and a second track;
   a plurality of uplift bow assemblies according to claim 1 to extend laterally across the trailer, the first and second car plates of each uplift bow assembly slideably engaging the respective first and second tracks;
   each frame having means to secure thereto peripheral portions of tarpaulin sections for covering a bed of the trailer.

9. The sliding tarpaulin system of claim 8 wherein the first and second car plates of at least one uplift bow assembly comprise one of a wheel or roller for slideably engaging the respective first and second tracks.

10. The sliding tarpaulin system of claim 8, wherein an outer uplift bow of at least one uplift bow assembly has a hinged attachment to an outer uplift bow of an adjacent uplift bow assembly.

11. The sliding tarpaulin system of claim 8, further comprising a front uplift bow assembly adjacent a front of the trailer, the front uplift bow assembly having:
   first and second front car plates,
   a frame having a center portion, a first downwardly extending frame arm connected to the first front car plate, and a second downwardly extending frame arm connected to the second front car plate; and
   a plurality of uplift bows, each uplift bow having a center portion, a first downwardly extending bow arm pivotably connected to the first front car plate, and a second downwardly extending bow arm pivotably connected to the second front car plate;

wherein each of the first and second front car plates is configured to support the selective pivoted connection of at least three uplift bows.

12. The sliding tarpaulin system of claim 8, further comprising a rear uplift bow assembly adjacent a rear of the trailer, the rear uplift bow assembly having:

first and second rear car plates, a rear frame having a center portion, a first downwardly extending frame arm connected to the first rear car plate, and a second downwardly extending frame arm connected to the second rear car plate; and a plurality of uplift bows, each uplift bow having a center portion, a first downwardly extending bow arm pivotably connected to the first rear car plate, and a second downwardly extending bow arm pivotably connected to the second rear car plate;

wherein each of the first and second rear car plates is configured to support the selective pivoted connection of at least three uplift bows.

\* \* \* \* \*